United States Patent
Crawford et al.

(10) Patent No.: US 8,619,239 B2
(45) Date of Patent: Dec. 31, 2013

(54) ACCURACY OF A LASER RANGEFINDER RECEIVER

(75) Inventors: Ian D. Crawford, Longwood, FL (US); Noal T. Chandler, Apopka, FL (US)

(73) Assignee: Analog Modules Inc., Longwood, FL (US)

(*) Notice: Subject to any disclaimer, the term of this patent is extended or adjusted under 35 U.S.C. 154(b) by 385 days.

(21) Appl. No.: 13/015,689

(22) Filed: Jan. 28, 2011

(65) Prior Publication Data
US 2012/0194798 A1     Aug. 2, 2012

(51) Int. Cl.
*G01C 3/08*     (2006.01)

(52) U.S. Cl.
USPC ......... 356/4.02; 356/3.01; 356/4.01; 356/4.1; 356/5.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 4,939,476 A | 7/1990 | Crawford | |
| 5,949,530 A * | 9/1999 | Wetteborn | 356/5.01 |
| 6,646,479 B1 | 11/2003 | Crawford | |
| 6,650,404 B1 | 11/2003 | Crawford | |
| 2005/0146705 A1 | 7/2005 | Lei et al. | |
| 2007/0252974 A1* | 11/2007 | Dimsdale | 356/5.01 |

OTHER PUBLICATIONS

Pulsed Time-Of-flight Laser Range Finder Techniques for Fast, high Precision Measurement applications, Oulun Yliopisto, Oulu 2004, 98 pages.
7500 Series High Performance Eyesafe APD Laser Rangefinder Receiver/counter, Analog Modules, Inc., Aug. 2010, 2 pages.
Johnson-Nyquist Noise, from wikipedia, 6 pages http://en.wikipedia.org/wiki/Johnson-Nyquist_noise.
DG535 Digital Delay / Pulse Generator (4 channel), Stanford Research Systems, 5 pages.
Pulse Generation, 9500/9600 Series, Quantum Corporation, 4 pages.
N7766A Twp-channel Multimode Optical Attenuator, Agilent Technologies, 2 pages.
High-resolution eye safe time of flight laser range finding, Delaye et al., LETI DSYS - CEA Grenoble, Proceedings of SPIE, vol. 4035 (2000), 10 pages.
Model 755 data Sheet, 2007, Analog Modules, Inc., 2 pages.
SmartFusion Intelligent Mixed signal FPGAs, Microsemi, Dec. 2010, 182 pages.

* cited by examiner

*Primary Examiner* — Luke Ratcliffe
(74) *Attorney, Agent, or Firm* — Gerald E. Linden (57) ABSTRACT

A technique for providing range correction values in a laser rangefinder range processor uses return pulse width (rather than return pulse amplitude) for correcting amplitude (range walk) and speed of light problems. A plurality of range correction values may be generated in a test setup (by simulating return pulse delays) and stored in a lookup table based on return pulse width, nominal range (time of return), and other factors such as temperature and pressure. The technique is also capable of correcting other problems such as receiver delay. The technique allows for the use of a saturating preamplifier with the increased sensitivity that it offers, and is relatively simple to implement, as it may be embedded within a digital processor (DSP) or gate array that is normally present for a basic range counter implementation.

19 Claims, 3 Drawing Sheets

Effect of Pulse Amplitude on Range

FIG. 1
Effect of Pulse Amplitude on Range

FIG. 2
Laser Rangefinder Receiver

FIG. 3
Range Processor

FIG. 3A

FIG. 4
Range Correction Test Setup

FIG. 5
Alternate Range Correction Test Setup

ACCURACY OF A LASER RANGEFINDER RECEIVER

TECHNICAL FIELD

This invention relates to rangefinders, and more particularly, single shot laser rangefinders.

BACKGROUND

A time-of-flight laser rangefinder transmits a pulse of laser light and measures the time to the echo return received after reflection from the target (round trip time of flight). The most common method of determining the start, and stop or return time, is by leading edge detection of the return pulse, when the leading edge crosses a threshold value. The threshold value may be established to exclude false alarms due to noise (typically one false alarm per thousand shots).

The amplitude of the return pulse varies as a function of laser peak power, target reflectivity, atmospheric transmittance, target angle, target reflection characteristics, target size, beam divergence, and range. Some effects, such as range, may be compensated for by varying the receiver gain or threshold amplitude (such as by using time programmed gain (TPG)) as a function of time (range). Some other factors may cause two orders of magnitude variation in return signal, and resulting variations (errors) in measured range.

Figure 1:
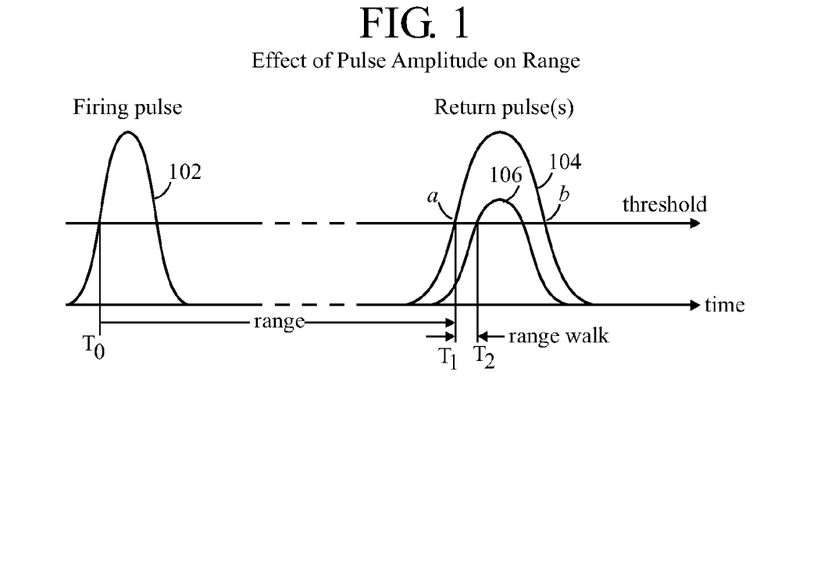
FIG. 1 is a diagram illustrating the effect of pulse amplitude on range measurement, contrasting the apparent return time for a strong return pulse with a weak return pulse.

FIG. 1 illustrates how the amplitude of the return signal can affect range measurement. A firing pulse 102 has its leading edge threshold crossing at $T_0$. This starts the range timing process, and the amplitude of the firing pulse 102 can be controlled. (The timing of the firing pulse can vary with different laser types, but is not dependent on external factors such as range, target. weather, etc. in $T_0$.)

A strong return pulse 104 has its leading edge threshold crossing at $T_1$. Range (see arrow labeled "range") to the return pulse 104 is derived from the elapsed time between $T_0$ and $T_1$ (distance=velocity×time). A weaker return pulse 106 has its leading edge threshold crossing at $T_2$. As is evident, due to the smaller amplitude of the weaker return pulse 106, $T_2$ occurs later than $T_1$. The later threshold crossing of the weak signal 106 will result in a longer measured range (no comparable arrow shown on drawing). This difference between apparent range (different time for same velocity implies different distance/range) of the strong and weak return pulses (signals) may be referred to as "range walk". In other words, the amplitude of the return pulse can cause error in the range measurement.

Another source of range error is variations in the speed of light at different altitudes, which can have a direct effect on range measurement. (Again, recall that the distance measurement is based on knowing the velocity, and measuring the time.)

One technique for mitigating these errors in range measurement is to employ very short laser pulses and high bandwidth receivers. The noise of these receivers increases rapidly with bandwidth due to both the expected root bandwidth increase, and spectral noise density increase due to the detector capacitance impedance at high frequencies. The narrow laser pulse reduces the energy transmitted. As a result, it is difficult to range long distances with a small simple (such as handheld) device using this technique. The methods of economical laser construction sometimes result in longer pulses with poorer range accuracy due to range walk with the leading edge detection.

Another technique for mitigating these errors is to use a constant fraction discriminator (CFD) that measures the same part of the start ($T_0$) and stop (return) pulse such as is disclosed in U.S. Pat. No. 6,646,479, incorporated by reference herein. This pulse discriminator technique is used in the AMI 7500 series range receiver (by Analog Technologies Inc.). In this method, the preamplifier is linear over the dynamic range of interest to preserve the pulse shape and normally results in less sensitivity due to the reduced preamplifier gain necessary to prevent saturation. The CFD solution adds complexity to a simple low cost rangefinder, and may also degrade the sensitivity due to the improved signal-to-noise ratio needed for accurate operation and detection of the laser pulse from within the background noise.

US Patent Application 20050146705, incorporated by reference herein, discloses a single-shot laser rangefinder, and uses a plurality of comparators each with its own threshold, a plurality of latches and multiple inputs to a microcontroller. The microcontroller makes range corrections as a function of signal amplitude. This approach has several disadvantages. It is complex, requiring a multi-wire interface from the comparators to the digital processor; it suffers from the sensitivity loss of the CFD solution mentioned above as the preamplifier output has to be linear in amplitude response over the dynamic range of interest; and it does not allow for the use of a variable threshold as a means of changing the sensitivity as a function of range, the simplest method of implementing TPG. As disclosed therein (Abstract):

> An improvement in a single-shot laser rangefinder having a photo-detector for detecting return laser pulse signals, a signal amplifier for amplifying the return laser pulse signals, and a range processor for determining the range of a reflecting object from the round trip time of flight of the return laser pulse signals. The difference in time at which the strongest laser pulse signal crosses the threshold for detection and the weakest laser pulse signal crosses the threshold for detection causes a timing error in the measured range.
>
> The improvement includes a plurality of comparators whose inputs are connected to the signal amplifier, each comparator outputting a digital level signal in response to an analog input signal that is more than the threshold set therein at the negative input terminal of the comparator; a plurality of latches, each latch connected to a respective comparator, the comparator outputs being fetched to the clock inputs of the latches so that when the digital level signal presents itself at the clock input, the latch then latches to the digital level signal; and a microcontroller having a plurality of inputs, each input connected to a respective latch for reading the outputs from the latches, the microcontroller having a store containing a plurality of pre-set correction factors corresponding to the range errors for various pulse amplitudes, the microcontroller having an output connected to the range processor for outputting the compensated range to the range processor upon decoding the output signals of the latches.

SUMMARY

It is a general object of the invention to provide a technique for improving the accuracy of single shot, time-of-flight, leading edge rangefinder receivers. A firmware correction technique is disclosed.

Generally, a technique for providing range correction values in a laser rangefinder range processor uses return pulse width (rather than return pulse amplitude) for correcting amplitude (range walk) and speed of light problems. A plurality of range correction values may be generated in a test setup (by simulating return pulse delays) and stored in a lookup table based on return pulse width, range (time of return), and other factors such as temperature and pressure. The technique is also capable of correcting other problems such as receiver delay. The technique allows for the use of a saturating preamplifier with the increased sensitivity that it offers, and is relatively simple to implement, as it may be embedded within a digital processor (DSP) or gate array that is normally present for a basic range counter implementation.

Various embodiments are disclosed herein.

Other objects, features and advantages of the invention may become apparent in light of the following description(s) thereof.

BRIEF DESCRIPTION(S) OF THE DRAWING(S)

The structure, operation, and advantages of the present preferred embodiment of the invention will become further apparent upon consideration of the descriptions set forth herein, taken in conjunction with the accompanying figures (FIGs). The figures (FIGs) are intended to be illustrative, not limiting. Although the invention is generally described in the context of these preferred embodiments, it should be understood that it is not intended to limit the scope of the invention to these particular embodiments.

DETAILED DESCRIPTION

Various "embodiments" of the invention (or inventions) will be described. An embodiment may be an example or implementation of one or more aspects of the invention(s). Although various features of the invention(s) may be described in the context of a single embodiment, the features may also be provided separately or in any suitable combination. Conversely, although the invention(s) may be described herein in the context of separate embodiments for clarity, the invention(s) may also be implemented in a single embodiment.

Electronic components such as resistors and inductors typically have two terminals, which may be referred to herein as "ends". Other electronic components, such as comparators and amplifiers may three terminals, including two "inputs" and an "output". In some instances, "signals" may be referred to, and reference numerals may point to lines that carry said signals. In schematic diagrams, the various electronic components may be connected to one another, as shown, by lines representative of conductive lines such as wires, or traces on a printed wiring board (PWB), or conductive lines and vias in a semiconductor integrated circuit (IC) chip. When lines in a schematic diagram cross over one another, a dot at the intersection of the two lines may indicate that the two lines are connected with one another, else (if there is no dot at the intersection) they are typically not connected with one another.

Figure 2:
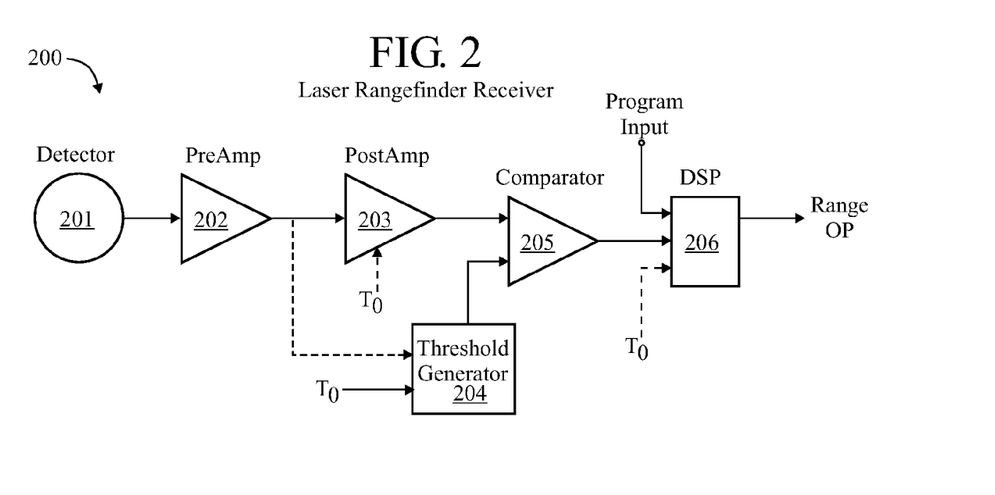
FIG. 2 is a diagram illustrating a laser rangefinder receiver that may be used in conjunction with the invention.

FIG. 2 is a block diagram of a relevant portion of a single shot, time-of-flight, leading edge rangefinder receiver 200 incorporating an embodiment of the range accuracy enhancement technique of the present invention. Since the operation of a Time-of-Flight (TOF) laser rangefinders is well known, this description is directed to those aspects of the receiver and counter that pertain to range accuracy enhancement. For a more detailed description of a laser receiver, within which the present techniques may be incorporated, reference is made to U.S. Pat. Nos. 4,939,476 and 6,650,404, both of which are incorporated by reference herein.

Detector 201 and preamplifier 202 convert a received (return) laser light pulse to an electrical signal (voltage). The preamplifier may have a high gain, typically 200 KV/A, in order that thermal or Johnson noise is kept low due to a high value of feedback or load resistor. This may results in preamplifier saturation for a wide range of return pulse amplitudes, but the recovery time of the saturation caused by the overload may be controlled using known techniques. One such technique is to use a diode or diodes to form a "soft clamp" for the output voltage as it described in U.S. Pat. No. 4,939,476 (Laser Rangefinder Receiver Preamplifier), incorporated by reference herein. As disclosed therein:

A preamplifier for a laser rangefinder receiver having two signal level modes comprises a first load resistor and an output to the receiver. A first diode is placed in series with a second diode, with the second diode being connected in parallel with a second load resistor. A positive feedback path is provided from the output to the junction of the first and second diodes, wherein the first and second diodes are nonconductive during a low signal level mode, and conductive during a high signal level mode.

The pulse width resulting from such an arrangement widens monotonically as the laser signal gets stronger.

The preamplifier 202 is followed by an additional postamplifier gain stage 203 which may optionally be fixed, or variable to perform a time programmed gain (TPG) function. When the laser (not shown) fires at time $T_0$ (time zero), a pulse is provided to start a range counter (not individually shown in this figure, see 301 in FIG. 3), which may be a function performed within a digital signal processor (DSP) 206. (The DSP 206 is described in greater detail with respect to FIG. 3.)

A $T_0$ signal (referenced in FIG. 1 as the leading edge threshold of the firing pulse) may be initiated by a small portion of the outgoing laser pulse picked up by the detector 201, or it could be a signal from the laser firing event (such as from a photodiode viewing a small portion of laser light) fed directly to start the range measurement.

A comparator 205 provides an output signal to the DSP 206 when the received (return) laser pulse is above a threshold value created (set) by a threshold generator 204. The amount (duration, period) of time that the magnitude of the return pulse signal is above the threshold value is a measure of the width of the return pulse signal pulse, starting when the return pulse signal increases to above the threshold and ending when the return pulse decreases to below the threshold value. This threshold may be based on, for example:

(i) a DC value,
(ii) another threshold value triggered by $T_0$ and varying as a function of range to create a time programmed threshold (A higher threshold needs a bigger signal to cross and therefore small signals can be ignored.) This is equivalent to reducing the receiver gain and using the original low threshold in (i) or (iii), or optionally variable when a time programmed threshold option is used.

(iii) a voltage set by a noise detector to maintain a constant signal-to-noise ratio (thus creating a constant false alarm rate), (iv) a combination of (i-iii).

Generally the laser (not shown) has a defined pulse width, typically 1 to 28 ns based on its technology, and the receiver would be optimized to work with that pulse. For example, more bandwidth is desirable with narrower pulses to optimize the signal-to-noise ratio. The receiver bandwidth limit causes the return laser pulse to be widened as it passes through the receiver. The amplifiers 202 and 203 widen the return pulse, for example, to a minimum of 30 ns typically due to the bandwidth limit, and when the preamplifier 202 is saturated, it can be >100 ns. A typical receiver used in this application may be a Model 755 Laser Rangefinder Receiver (Analog Modules, Inc.), the specification of which is incorporated by reference herein.

There are therefore two "times" associated with the return pulse:
- an instant in time (such as $T_1$ or $T_2$ as described with respect to FIG. 1) which is used to calculate the "nominal" (uncorrected) range measurement; and
- a period of time during which that the magnitude of the return pulse signal is above the threshold value, which is a measure of the width of the return pulse signal (for example, between the points "a" and "b" in signal 104 in FIG. 1).

To increase resolution in the measurement of return pulse width, a higher frequency clock (not shown, refer to 303 FIG. 3) may be used. Alternatively, both clock edges (leading and trailing edge detection) may be used. Alternatively, a quasi-integrator RC circuit could be used at the input to the pulse width counter (302, FIG. 3), with an A-D or low threshold comparator to stretch the pulse to the existing width counter (in the DSP) to give a higher resolution measurement of the return pulse energy.

As described in greater detail below, the invention provides a method of improving the accuracy of the laser rangefinder receiver in a number of circumstances, using the return pulse width (time above the threshold value) and the measured range value as inputs to generate a range correction value. Other inputs to the lookup table matrix correction circuits (304, FIG. 3) such as temperature, barometric pressure, altitude and the like, which may have an effect on the ranging measurement may be used to further improve the accuracy, using the same correction method in the DSP 206.

In principle, return pulse width alone can be used to determine the range correction value if no form of TPG is used, and would only be of value in a simple rangefinder for limited range values. However, when using any form of TPG, both width and range are needed for the range correction value, as the width is affected by the range as the gain or threshold is changed.

The program input to the DSP 206 configures the gate array to form counters etc. creating all the DSP functions. It is done during manufacture to create the functions and during test (calibration) to set the correction values which are stored. Normally it is never used again.

Figure 3:
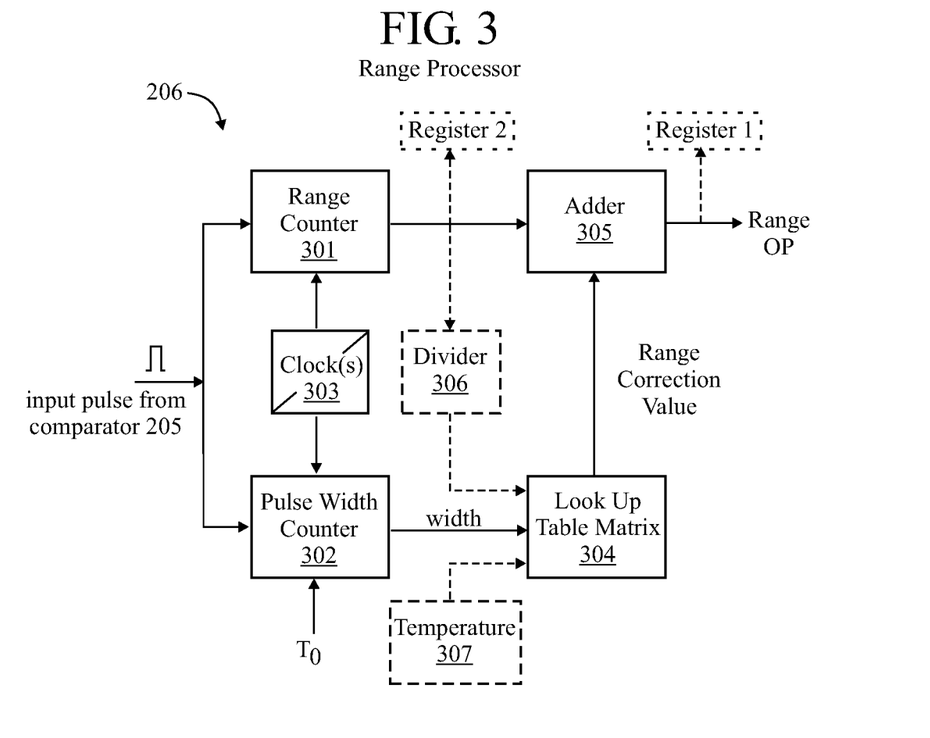
FIG. 3 is a diagram illustrating a range processor that may be used in conjunction with the FIG. 2 embodiment of the invention.

Some additional features shown in the rangefinder receiver of FIG. 2, may include:
- providing the output of the preamp 202 to the threshold generator 204 to provide a time programmed threshold function in the threshold generator 204 ($T_0$ is used to initiate the threshold change)
- providing the $T_0$ signal to the post amp 203 to provide a time programmed gain (TPG) function ($T_0$ is used to initiate the gain change)
- providing the $T_0$ signal to DSP 206 to reset the pulse width counter (302, FIG. 3), if needed, such as for processing multiple returns FIG. 3 provides a more detailed view of some of the internal elements and functions which may be incorporated into the digital signal processor (DSP) 206. These may be implemented by a high speed programmable gate array (FPGA), but alternative digital means may be employed, such as would be known to those skilled in the art. It should be understood that there may be a number of peripheral and housekeeping functions (such as clock distribution and processing, time delays, registers, buffers, interfaces, line drivers, etc.) that are omitted for clarity, but they do not affect the method of operation. An example of a suitable high speed gate array is Actel A3P250. The Actel A2F200M3F SmartFusion includes memory, a microprocessor and other features such as ADC (analog to digital converter) to allow a higher level of integration and ease of incorporating the optional features such as temperature measurement.

At the time of laser firing, $T_0$, the range counter 301 is started and the pulse width counter 302 is reset awaiting the first return pulse. As is known to those skilled in the art, there may be a minimum range gate that would hold this condition until the range is sufficient and the counter is ready to process returns. This minimum range gate may be derived from the range counter 301 count.

The $T_0$ signal may be used to reset the pulse width counter 302 for a new measurement, or the pulse width counter 302 may be reset after each width is stored in a register as a table input. This would allow multiple return pulses to be processed, as described in greater detail hereinbelow.

A stable high-speed clock 303 drives the range counter 301, for example, a crystal controlled oscillator at 150 MHz. The high speed clock 303 also may also be used drives the pulse width counter 302. Alternatively, an independent or related (to 301) high speed clock may be used to increase resolution of pulse width measurement. For example, a frequency doubled clock (or frequency doubled output of the clock 301) may be used to enhance the pulse width measurement resolution in the pulse width counter 302. Here we see again that two "times" are determined
- a "nominal" (uncorrected) range measurement for the return pulse, which may be performed by measuring from the leading edge of $T_0$ to the leading edge of the return pulse as shown in FIG. 1; and
- a period of time, which may be measured with the higher resolution clock, which represents the measure of the width of each return pulse signal.

When a laser return echo (return pulse) arrives, the range counter 301 counts the number of clock cycles, measuring the time (T) of the return from $T_0$. The time of the return is related to range by the clock frequency, in a conventional way as is well known (generally, distance=velocity×time=2× range).

The pulse width counter 302 starts (begins counting) on the leading edge (first, ascending threshold crossing, or leading edge) of the return pulse (104 or 106), which is a fast digital signal. The pulse width counter 302 stops on the trailing edge (second, descending threshold crossing, or trailing edge) of the return pulse, and the number of counts, which represents (is a measure of) the pulse width of the return signal, is input to (stored in) a lookup table matrix 304 within the DSP 206.

Meanwhile, the range counter 310 is determining the return pulse range (or "nominal", uncorrected range), typically working from the leading edges of both the firing pulse signal ($T_O$) and the return pulse signal, and this range value is input to the lookup table matrix 304.

A number of range (distance) correction values are stored in the lookup table matrix 304, and are associated with the measured range and width of the return pulse signal. These correction values and may be determined for (programmed into) the lookup table during a calibration step (two exemplary calibration procedures are described below with respect to FIG. 4 and FIG. 5).

The lookup table matrix 304 contains a plurality of range correction values associated with (stored close to) the combination of these two measured values (range and width of the return pulse signal) and, based on the measurement of these two values, an appropriate range correction value is sent to an adder 305 that adds (or subtracts) the stored range correction value for this combination to the range counter 301 output ("nominal", uncorrected range) to give a final corrected range output (Range OP).

A method of filling in the range correction values of the lookup table 304 is described below ("Calibration").

Some additional features which may be incorporated into the range processor 206 may include.

A divider 306 may be provided for scaling the range to make a small correction for clock frequency error, and settable for different units if the crystals need corrected, as described in greater detail hereinbelow.

Registers 1 and 2 for storing the values of multiple measured ranges, as described in greater detail hereinbelow temperature sensing 307 as an input to the lookup table matrix.

As an alternative to using a lookup table 304, the range correction value may be calculated using an algorithm or equation representing the correction functions and outputting the range correction value to achieve essentially the same result. The method selected (lookup table versus algorithm) may depend on the digital device used for the processor, but the lookup table implementation may be generally preferred because of the difficulty in deriving equations to match the non-linear behavior of the function. Modern DSP's have substantial inexpensive storage capacity, and setting in (storing a large plurality of) measured (and/or calculated) values is generally simpler and more economical. (The equation or algorithm may have constants inserted to match the relationships of pulsewidth and range (and temperature) to a correction value to get zero range error, and may be best suited to a "one value for all" units installation.)

This process may be extended to multiple or last returns by counter design methods known to those skilled in the art. For example, it is possible that one laser firing may generate a laser beam that may intercept multiple objects such as vegetation or camouflage on its way to the target (shorter range than the target), or a portion of the beam may overshoot the target and give an echo from a longer range.

For example, a first corrected range return (range OP) from the adder 305 may be stored in a register (Register 1) and the pulse width counter 302 reset after its data is used or stored in anticipation of use. The range counter 301 may keep running with the instantaneous range count sampled on the fly and held in another register (Register 2) each time a new return signal arrives. The new corrected range from the adder 305 may be stored in the DSP 206 and the process repeated. After a maximum range limit is reached, which may defined by the counter size or the application, then the range and width counters may be reset awaiting a new $T_O$. The stored multiple corrected ranges (first, second, last etc.) from the laser firing are made available to a user (not shown) for selection and disposition. The registers (1 and 2) may be used to store the value of multiple measured ranges, and an appropriate range correction value may be applied separately and independently to each range of the measured ranges.

The range counter (301), pulse width counter (302), adder (305) and lookup table (304) shown in FIG. 3 may advantageously be combined in one high speed gate array (FPGA) or similar digital processing device to generate the range correction value. With these functions combined, it may be efficient and convenient to add a further accuracy enhancing feature. For example, the clock frequency has to be set to an exact number such as 149.896229 MHz, and this is expensive to manufacture exactly. Moreover, light slows down in the atmosphere and therefore time of flight rangefinders should be calibrated at a certain height above sea level or atmospheric pressure as a means of estimating reflective index of the light transmitting medium. The use of a lower-cost crystal clock at a standard frequency (such as 150 MHz) is cheaper, and the frequency could be adjusted to compensate for the air refractive index. This may be done in a somewhat similar way by adding or subtracting a small error signal to the measured output of the range counter 301. This error signal would be a small fraction of the measured range, generated by a divider 306, and the arithmetic operation may be done after the ranging in real time is complete. (This method of "correcting the clock" allows the use of a standard crystal frequency, with a fixed fraction of the measured range value subtracted or added to the measured value to create (result in) a new (modified/adjusted) range equivalent to the value that would be obtained with the desired clock frequency.)

Figure 3A:
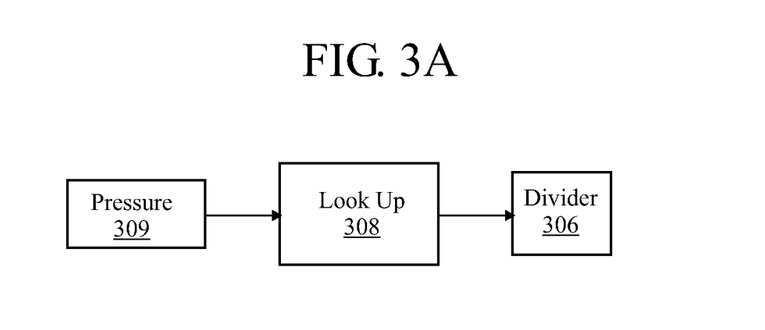
FIG. 3A is a diagram illustrating some additional features that may be used in conjunction with the FIG. 3 embodiment of the invention.

In a simple rangefinder, the fraction (provided by the divider 306) may be fixed, but for extreme accuracy it may be set by external means; directly, or by referring to a lookup table (separate from the lookup table 304). With reference to FIG. 3A, for example, the lookup table 308 for the divider 306 may have a digitized pressure measurement as an input (in the manner of optional temperature input 307) and a range fraction as an output. It is apparent that the method taught in FIGS. 4 and 5 would apply without change, except that the demanded reference range from the computer 405 is the desired correct range in the conditions of rangefinder use, thus forcing the DSP to take into account and correcting for the clock error and actual speed of light (as well as any other errors as described above in the walk correction method). The correction factors which have been stored can be used to correct essentially all range errors to give the correct range output. It should be clear to those skilled in the art that several alternative implementations of the same function may be created without deviating from the spirit of the invention, including separation of the range walk and clock correction functions. (The clock correction provided by the divider 206 is proportional. The range correction provided by the pulse width counter and lookup table 304 is point-by-point. As mentioned above, an equation may be used in lieu of the lookup table 304.)

It should be understood that, in various embodiments disclosed herein, $T_O$ may be an electrical signal instead of an optical signal injected into the receiver laser pulse path, or directly into the DSP as a start pulse.

Calibration

Figure 4:
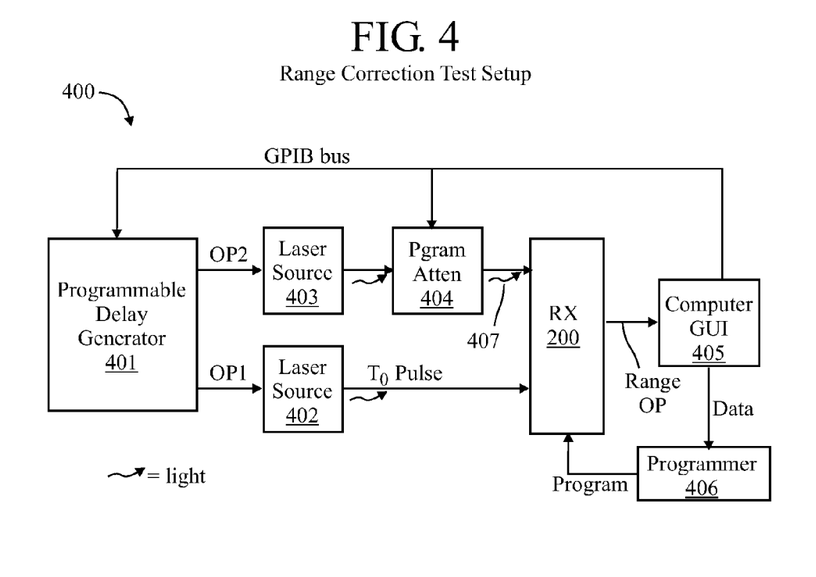
FIG. 4 is a diagram of a range correction test setup that may be used in conjunction with the invention.
Figure 5:
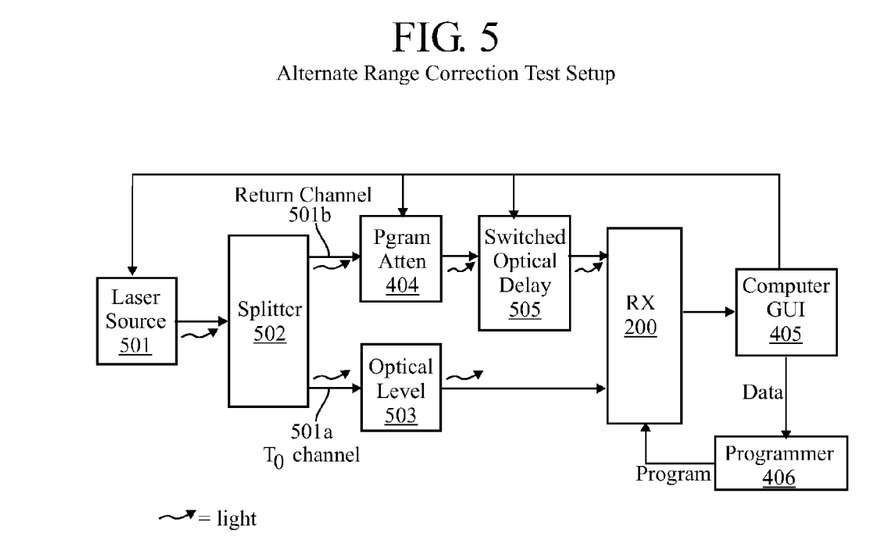
FIG. 5 is a diagram of an alternate range correction test setup that may be used in conjunction with the invention.

A desirable feature of the rangefinder receiver technique disclosed herein is that it is relatively easy to calibrate. (Calibration generally involves generating lookup table values, and correcting for errors.) An embodiment of a calibration technique is shown in FIG. 4. An alternate embodiment of a calibration technique is shown in FIG. 5. The calibration techniques described herein may be used to calibrate the laser rangefinder receiver (and processor) shown in FIGS. 2 and 3.

FIG. 4 ("range correction test setup") shows an embodiment of a calibration technique or procedure comprising a programmable delay generator 401 with at least 2 outputs (OP1, OP2). A suitable Programmable Delay Generator may be the DG535 Digital Delay Generator (Stanford Research) or the 9512 Pulse Generator (Quantum Composers). The Programmable Delay Generator 401 may be controlled through a GPIB (General Purpose Interface Bus, IEEE 488) by computer/user interface 405 (which may be GUI).

The first output (OP1) of the programmable delay generator 401 drives a first laser source 402 to generate a "$T_0$ pulse", and the second delayed output (OP2) drives a second similar laser source 403 with a fiber output into a GPIB programmable attenuator 404 (such as Agilent 7751A series).

Although a general purpose interface bus (GPIB) is shown, it should be understood that other methods of controlling the delay generator 401, attenuator 404 and laser sources may be used such as RS232, or separate real time logic signals.

The output of the attenuator 404 (delayed output signal 407) is used as the (simulated) return echo signal with programmable delay time and amplitude, and this value is known and calibrated at the receiver detector (201, see FIG. 2) part of the receiver (RX) 200. The programmable delay time simulates range, for calibration of the receiver. A plurality of return signals may thus be simulated, varying conditions such as time (range) and amplitude, and appropriate correction values servoed for zero range error in each condition and set into the lookup table matrix (304).

The $T_0$ pulse amplitude (from laser source 402) may also be arranged to be the correct level by optical components such as attenuators, diffusers etc. as is well known to practitioners. The delayed output 407 of the programmable attenuator 404 is arranged to be adjustable in time and amplitude over the range of echo signals expected.

With this set up, test range accuracies down to 1 cm are possible. Values for the lookup table (304) may be derived and used for all similar receivers by embedding the correct values within the DSP (206) configuration program. If desired, each range receiver may be calibrated individually for increased accuracy.

It is also possible to extend the lookup table (304) to correct for the effect of temperature variations by using the same calibration process at different receiver temperatures and storing the results in the lookup table (304). An optional temperature sensor (307, see FIG. 3) may be incorporated in the equipment to give this condition.

For a first time set up, the computer test firmware may program the lookup table (304) initially with zero range correction stored, and then send a trigger pulse to the programmable delay generator 401. A $T_0$ pulse will then be output from the first laser source 402. This $T_0$ pulse should have the same characteristics as the recommended equipment operating condition in terms of wavelength and shape.

After a programmed precision stable delay created by delay generator 401, the second laser source 403 outputs a similar pulse through the programmable attenuator 404. This pulse is received as a (an "ersatz" or similitude of) return echo by the receiver (RX) 200, and the range time is measured by the range counter 301 with an initial correction error of zero. The computer firmware 405 compares the range which is measured (arrival time of the return signal) to the known range sent to the precision delay generator 401 and the difference is set into the lookup table 304 for that value of range and return signal level.

The process may be repeated for multiple ranges and echo signal amplitudes with the proper correction amount servoed for zero range error in each condition (range and amplitude, and temperature) set into the lookup table matrix 304. The TPG (time programmed gain) may be applied normally during this process so that any variations due to its operation are factored into the calibration. The TPG varies the sensitivity of the receiver as a function of range so that there is less sensitivity to short range strong signals and more sensitivity to long range weaker signals.

After the receiver has been calibrated, in use (in normal operation, in the field), a pulse is fired, and when a return signal is received the range is known and the correction factor (range correction value from 304) closest to the measured return pulse width count is applied, to arrive at a corrected Range OP.

A variation of the FIG. 4 embodiment would be making $T_0$ an electrical signal instead of an optical signal injected into the receiver laser pulse path, such as a signal derived from the signal driving the laser.

The lookup table 304 contains a large number of discrete correction values, and the measured range and pulse width may not exactly match these stored values. Intermediate values may be calculated using known (conventional) interpolation methods. (Interpolating between stored correction values to give a more accurate correction for width, range, temperature, or any combination of these which is not a stored value.) Alternatively, the closest value in the table (304) either above or below the measured input may be used. This correction may be positive or negative depending on the results of the calibration cycle. The stored values are normally retained for the life of the receiver/counter assembly unless, for example, it needs to be recalibrated for a different laser pulse width, or calibrated as part of the complete laser range finding system. Once the calibration values are determined, they may be programmed into all similar receiver/counters.

If an equation (rather than the lookup table) is used to generate the correction value, then the constants may be entered to create the zero range error condition in all test circumstances to create a "best fit" equation. Generally, this would require more complex test software or a one-time optimization.

Other techniques and/or variations may be implemented to accomplish the error measurement (calibration) task. For example, slightly better accuracy may be achieved by using a common single laser source (rather than two laser sources 402, 403), and implementing switched optical delays, as described with respect to FIG. 5.

FIG. 5 shows an alternate embodiment of a range correction (calibration of 304) technique, having some elements in common with the technique described with respect to FIG. 4. A laser source 501 (the output thereof) may be split into a $T_0$ channel 501a and a return channel 501b using a fiber optic splitter 502. The output of the $T_0$ channel 501a may be adjusted by commonly known optical level control means 503 such as an optical ND (neutral density) filter, attenuator, or diffuser with spacing to adjust the light level at the detector 201 (FIG. 2) setting $T_0$ at the desired value. The return channel 501b goes through a programmable attenuator 504 (similar to 404) then through a plurality of fiber optic delays 505 that can be switched in and out with optical switches, such as programmed from the GPIB (IEEE-488) bus, to simulate a plurality of return pulse conditions (ranges, amplitudes). The optical delay lines may be calibrated lengths of optical cable.

An advantage of this method (FIG. 5) over the previously-described method (FIG. 4) is that only a single laser source 501 is used, and therefore the pulse shape for the $T_0$ (firing) pulse and the return pulse will be similar (essentially identical) as they have the same source, and so the error budget for any source laser jitter is removed.

A disadvantage of this method (FIG. 5) is that it is generally more difficult to create optical delays than it is to create and control electrical delays (FIG. 4).

As an alternative to the calibration techniques (FIGS. 4 and 5) described herein, a "live range" with multiple targets may be surveyed, using the rangefinder, to measure the correction factors.

While the invention has been described with respect to a limited number of embodiments, these should not be construed as limitations on the scope of the invention, but rather as examples of some of the embodiments. Those skilled in the art may envision other possible variations, modifications, and implementations that are also within the scope of the invention, based on the disclosure(s) set forth herein.

What is claimed is:

1. A method of generating a range correction value for a time-of-flight laser rangefinder receiver comprising:
    detecting a return pulse and generating a return pulse signal;
    determining a width of the return pulse;
    providing a range correction value based on the width of the return pulse;
    determining a range of the return pulse; and
    providing the range correction value based on the width and the range of the return pulse;
    wherein a plurality of range correction values are stored during a calibration procedure in a lookup table matrix;
    wherein the calibration procedure comprises:
    providing two laser sources;
    using a delay generator to generate a first output pulse for a first of the two laser sources to generate a $T_0$ pulse simulating a firing pulse;
    using the delay generator to generate a plurality of selectable second output pulses for a second of the two laser sources to simulate a plurality of delayed return pulses, and providing these pulses through a programmable attenuator; and
    performing the procedure for multiple ranges and echo signal amplitudes for the simulated return pulses with a proper correction amount servoed for zero range error in each condition set into the lookup table matrix.

2. The method of claim 1, wherein:
    the range of the return pulse is based signal on leading edge detection.

3. The method of claim 1, further comprising:
    interpolating between stored correction values to give a more accurate correction for width, range, temperature, or any combination of these which is not a stored value.

4. The method of claim 1, further comprising:
    providing a threshold value for a comparator; and
    providing the return pulse signal to the comparator;
    wherein the width of the return pulse is related to a time that the return pulse signal is above a threshold value;
    wherein the threshold value is based on at least one of:
    (i) a DC value,
    (ii) a time programmed threshold, and
    (iii) a voltage set by a noise detector to maintain a constant signal-to-noise ratio.

5. The method of claim 1, further comprising:
    using a set of stored correction factors as a function of range with at least one of a time programmed gain (TPG) function and a time programmed threshold function used in the range receiver.

6. The method of claim 1, further comprising:
    using a digital processor (DSP) to measure the return pulse width;
    wherein the DSP comprises a gate array for storing preprogrammed range correction values and comprises an adder to sum a correction value with a measured range to generate an accurate output range.

7. The method of claim 1, further comprising:
    storing values for multiple measured ranges and applying an appropriate correction factor separately and independently to each range.

8. The method of claim 1, further comprising:
    correcting for a range of temperatures.

9. The method of claim 1, further comprising:
    providing a clock; and
    correcting the clock to allow the use of a standard crystal frequency, with a fraction of the measured range value subtracted or added to the measured value to create a new range if that value that would be obtained with the desired clock frequency;
    further comprising:
    changing the fraction value based on an external input; and
    storing a plurality of fraction values in a lookup table and selecting a given stored value based on the external input.

10. A method of generating a range correction value for a time-of-flight laser rangefinder receiver comprising:
    detecting a return pulse and generating a return pulse signal;
    determining a width of the return pulse;
    providing a range correction value based on the width of the return pulse;
    determining a range of the return pulse; and
    providing the range correction value based on the width and the range of the return pulse;
    wherein a plurality of range correction values are stored during a calibration procedure in a lookup table matrix;
    wherein the calibration procedure comprises:
    providing a single laser source;
    splitting an output of the laser source into a $T_0$ channel and a return channel;
    providing a programmable attenuator and a plurality of fiber optic delays that can be switched in and out in the return channel to simulate a plurality of return pulses having various ranges and amplitudes; and
    performing the procedure for multiple ranges and echo signal amplitudes for the simulated return pulses with a proper correction amount servoed for zero range error in each condition set into the lookup table matrix.

11. The method of claim 10, wherein:
    the range of the return pulse is based signal on leading edge detection.

12. The method of claim 10, further comprising:
    interpolating between stored correction values to give a more accurate correction for width, range, temperature, or any combination of these which is not a stored value.

13. The method of claim 10, further comprising:
    providing a threshold value for a comparator; and
    providing the return pulse signal to the comparator;
    wherein the width of the return pulse is related to a time that the return pulse signal is above a threshold value;
    wherein the threshold value is based on at least one of:
    (i) a DC value,
    (ii) a time programmed threshold, and
    (iii) a voltage set by a noise detector to maintain a constant signal-to-noise ratio.

14. The method of claim 10, further comprising:
using a set of stored correction factors as a function of range with at least one of a time programmed gain (TPG) function and a time programmed threshold function used in the range receiver.

15. The method of claim 10, further comprising:
using a digital processor (DSP) to measure the return pulse width;
wherein the DSP comprises a gate array for storing preprogrammed range correction values and comprises an adder to sum a correction value with a measured range to generate an accurate output range.

16. The method of claim 10, further comprising:
storing values for multiple measured ranges and applying an appropriate correction factor separately and independently to each range.

17. The method of claim 10, further comprising:
correcting for a range of temperatures.

18. The method of claim 10, further comprising:
providing a clock; and
correcting the clock to allow the use of a standard crystal frequency, with a fraction of the measured range value subtracted or added to the measured value to create a new range if that value that would be obtained with the desired clock frequency;
further comprising:
changing the fraction value based on an external input; and
storing a plurality of fraction values in a lookup table and selecting a given stored value based on the external input.

19. A time-of flight laser rangefinder receiver comprising:
a detector for generating a return pulse signal;
means for determining a width of the return pulse signal;
means for providing a range correction value based on the width of the return pulse; and
means for determining a range of the return pulse;
wherein the range correction value is based on the width and the range of the return pulse;
wherein a plurality of range correction values are stored during a calibration procedure in a lookup table matrix, with a proper correction amount servoed for zero range error in each condition set into the lookup table matrix;
further comprising at least one laser source, and
in the case of a single laser source, further comprising means for splitting an output of the single laser source into a $T_0$ channel and a return channel; a programmable attenuator and a plurality of fiber optic delays that can be switched in and out in the return channel to simulate a plurality of return pulses having various ranges and amplitudes; and
in the case of two laser sources, a delay generator for generating a first output pulse for a first of the two laser sources to generate a $T_0$ pulse simulating a firing pulse and for generating a plurality of selectable second output pulses for a second of the two laser sources to simulate a plurality of delayed return pulses, and a programmable attenuator acting on the pulses.

* * * * *